United States Patent [19]

Burrell

[11] Patent Number: 4,829,981

[45] Date of Patent: May 16, 1989

[54] PORTABLE WARMING APPARATUS FOR A CUP

[76] Inventor: Alona R. Burrell, 4011 Cherrywood Ave., Los Angeles, Calif. 90008

[21] Appl. No.: 164,869

[22] Filed: Mar. 7, 1988

[51] Int. Cl.⁴ .............................................. F23C 1/00
[52] U.S. Cl. .................................. 126/265; 126/246; 126/253; 126/39 E; 431/85; 236/99 R
[58] Field of Search ............... 126/253, 246, 262, 265, 126/266, 38, 39 E; 431/85; 236/99 R

[56] References Cited

U.S. PATENT DOCUMENTS

| 1,155,257 | 9/1915 | Marcille | 431/85 |
| 1,850,646 | 3/1932 | Ross-Watt | 431/85 |
| 2,004,636 | 6/1935 | Pymm | 431/85 |
| 3,509,870 | 5/1970 | Sheppard | 126/265 |

Primary Examiner—Randall L. Green

[57] ABSTRACT

A portable apparatus for warming a cup and its contents has a fuel reservoir connected through a valve controlled by a snap switch to a combustion cage. A thermocouple under the combustion cage returns the snap switch to an "OFF" position, cutting off the flow of fuel, once a predetermined temperature has been reached.

9 Claims, 3 Drawing Sheets

PORTABLE WARMING APPARATUS FOR A CUP

BACKGROUND OF THE INVENTION

1. Field of the Invention

This invention relates to a portable warming apparatus for cups utilizing butane burned in a combustion cage. In particular, it has reference to an apparatus with automatic shut-off provided by a temperature sensing device which includes a thermocouple located below the combustion cage.

2. Brief Description of the Prior Art

Available devices on the market designed to keep the contents of a cup warm mostly use an electric heating element typically requiring access to line current. Access to line current, of course, restricts the portability of such a device. Even when line current was available through household outlets, the necessary cord stretching from the apparatus to the outlet was, at best, inconvenient and at times dangerous when the cord presented an obstacle to the free passage of diners around the table.

Attempts have been made in the past to overcome the need for an electric cord. U.S. Pat. No. 4,185,614 to Eiko Egawa shows a device with a wick burning liquid fuel in a saucer arrangement. U.S. Pat. No. 4,191,173 to Dedeian, et al. shows a liquid fuel reservoir contained in the cup's handle feeding a burner located beneath a domed portion of the bottom wall of the cup. Neither of the two disclosed portable apparatus, however, had a temperature control mechanism. Thus, the heating of the cup and its contents continued even after the desired serving temperature was reached. Such additional heating could bring the temperature of the contents of the cup to the point of burning the lips of the drinker, and sometimes even heat the cup contents sufficiently to evaporate all the contents of the cup.

OBJECTS OF THE INVENTION

It is the primary object of the invention to provide a portable heating apparatus which is simple and inexpensive to manufacture and which is convenient to use.

Another object of the invention is to provide a portable liquid warming device for a cup which does not depend upon access to line current.

A final object of the invention is to provide an apparatus for heating a cup contents to a desired temperature, at which point the apparatus will turn itself off and heat the contents of the cup no further.

SUMMARY OF THE INVENTION

It has been found that these and other objects of the invention may be obtained by an apparatus for heating the contents of a vessel such as cup containing a beverage comprising: a housing with an upper surface adapted to support and transmit heat to said vessel, burner means within said housing, a fuel reservoir connected to said burner, ignition means for said burner, valve means to control flow of fuel from said reservoir to said burner, switch means to control said valve means, and thermocouple means connected to said switch means such that said thermocouple means, upon sensing a predetermined temperature, moves the switch to close the valve and thereby shuts off the flow of fuel from said reservoir to said burner.

BRIEF DESCRIPTION OF THE DRAWINGS

The invention having been described in general terms, reference will now be made to the accompanying drawings in which.

DETAILED DESCRIPTION OF THE PREFERRED EMBODIMENT

Figure 1:
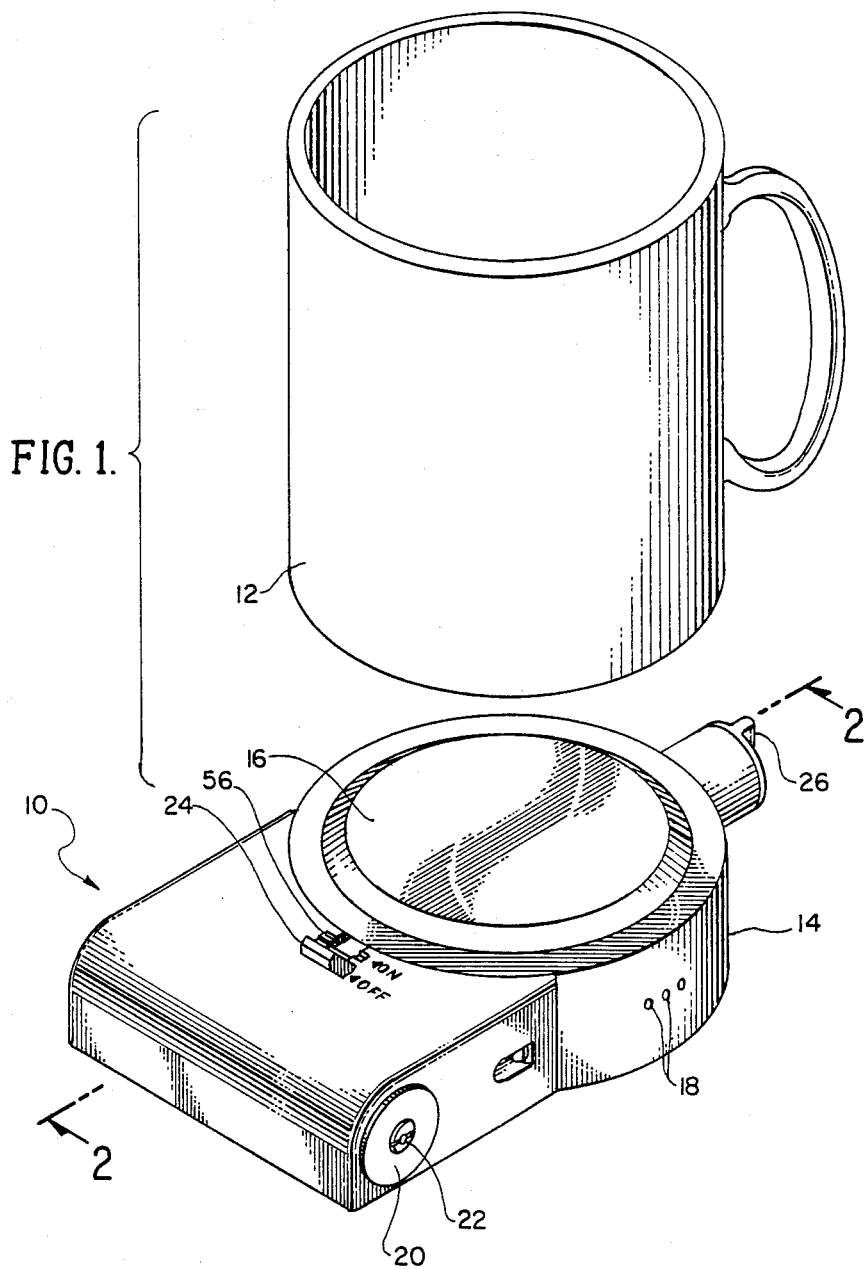
FIG. 1 is a perspective view of the apparatus and a cup.

Referring now to FIG. 1, the liquid warming device 10 for a cup 12 includes a housing 14. The housing 14 has on its top a raised circular area 16 for frictional engagement of the bottom of cup 12. The housing 14 also has air holes 18 to admit oxygen and allow combustion products to escape. The housing 14 is further extended to include a fuel reservoir 20. The fuel reservoir 20 contains a refill valve 22. Also shown on the top of housing 14 is finger pad 24 of the switch means. On the opposite side of the raised circular heating pad 16 is a knob 26 for operating the ignition means.

Figure 2:
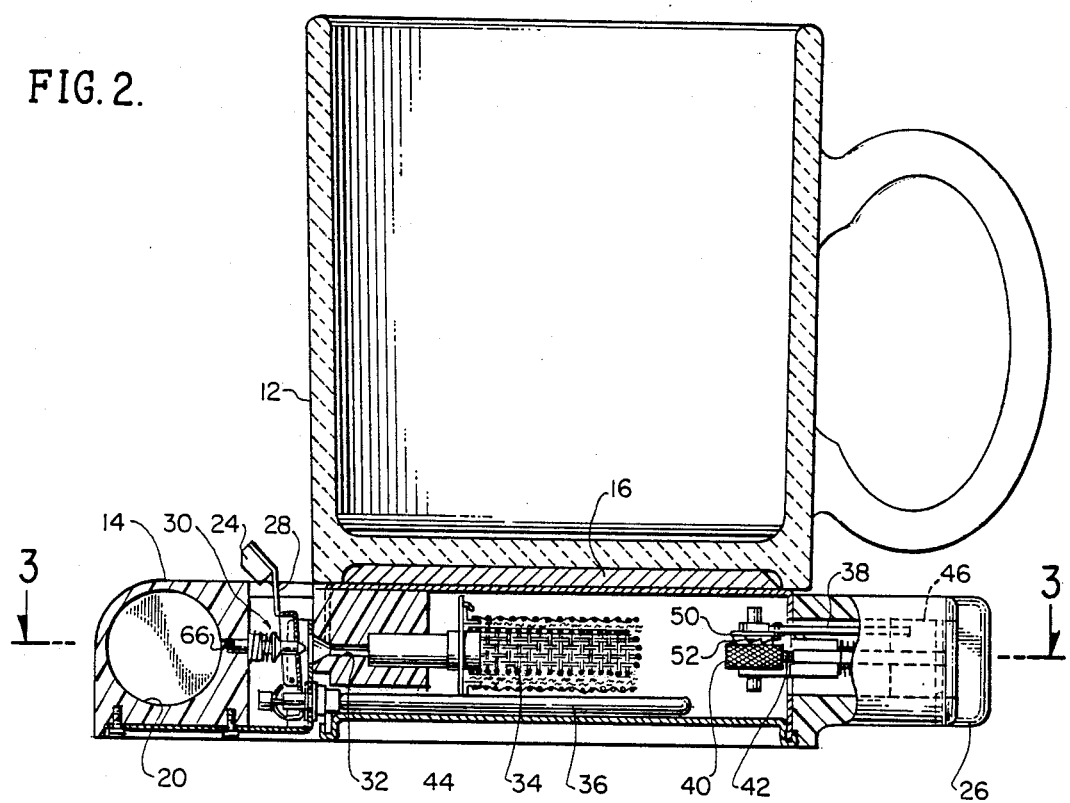
FIG. 2 is a cross-section of the apparatus with the cup resting on top.
Figure 3:
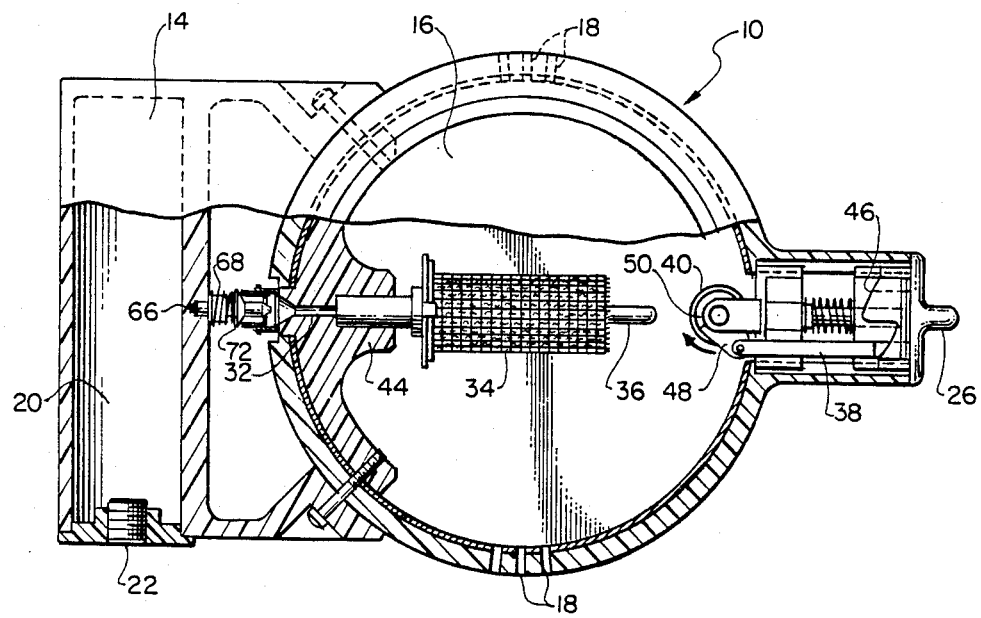
FIG. 3 is a partial sectional plan view taken along line 3—3 of FIG. 2.

FIG. 2 shows a cross-section of the housing 14 with the fuel reservoir 20 at the left of the drawing. Finger pad 24 is shown on top of the housing 14 attached to snap switch 28. Snap switch 28 is shown controlling valve 30, the valve which controls fuel flow from reservoir 20. The other end of valve 30 is adapted to enter pipe connection 32. Pipe connection 32 allows the jet stream of fuel to be directed from the valve 30 to combustion cage 34. Disposed below combustion cage 34 is thermocouple 36. It should be noted that the thermocouple 36 is located below the fuel combustion cage 34, and not between the fuel combustion cage and the surface to be heated. At the righthand side of the housing 14, as shown in FIG. 3, is knob 26. The knob is connected to a connecting means 38 so that when knob 26 is twisted, it causes serrated sparking wheel 40 to rotate against flint 42. One end of connecting means 38 is connected to a cam 46 attached to knob 26, said cam connecting through an eccentric 48 to a ratchet wheel 50. The ratchet wheel 50 engages a separate set of ratchet teeth 52 mounted on serrated sparking wheel 40. When the serrated sparking wheel 40 is rotated against flint 42, sparks are created that ignite the fuel in combustion cage 34. Of course, this should be done after the snap switch 28 has opened valve 30 permitting fuel to flow from reservoir 20 into the combustion cage 34. Insulation 44 is provided between combustion cage 34 and valve 30. The insulation is penetrated by pipe connection 32 to supply fuel to the combustion cage 34 from the reservoir 20.

Figure 4:
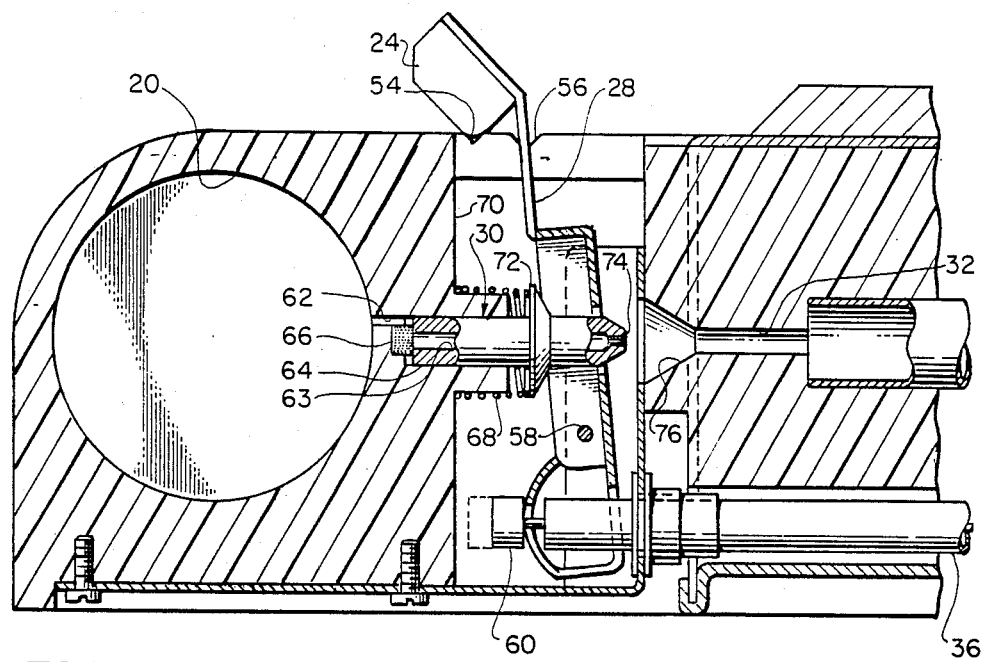
FIG. 4 is an enlarged cross-sectional detail showing the reservoir and switch and valve means, the switch and valve means being in a closed, non-operating position.
Figure 6:
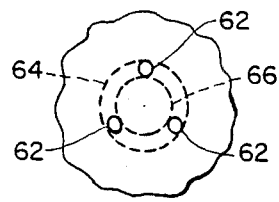
FIG. 6 is an enlarged partial view of the fuel parts taken along line 6—6 of FIG. 5.

In FIG. 4 finger pad 24 is shown positioned in the "OFF" detent 54, which is next to the "ON" detent 56. Snap switch 28 is shown in this enlarged detailed cross-section view pivoting on a metal pin 58. The bottom of snap switch 28 engages plunger 60 of the thermocouple 36. When snap switch 28 is in the "OFF" position, no fuel can flow from reservoir 20 through valve 30. Looking at valve 30 in greater detail, fuel ports 62 feed the fuel from reservoir 20 to the valve 30. The valve is further composed of a tube 64 that is shown in engagement with rubber washer 66, shown in FIG. 6, while in the "OFF" position. The walls of the tube 64 are of sufficient thickness to, at their inside diameter, engage washer 66 and prevent the flow of fuel through the orifice 63 in the tube 64.

Figure 5:
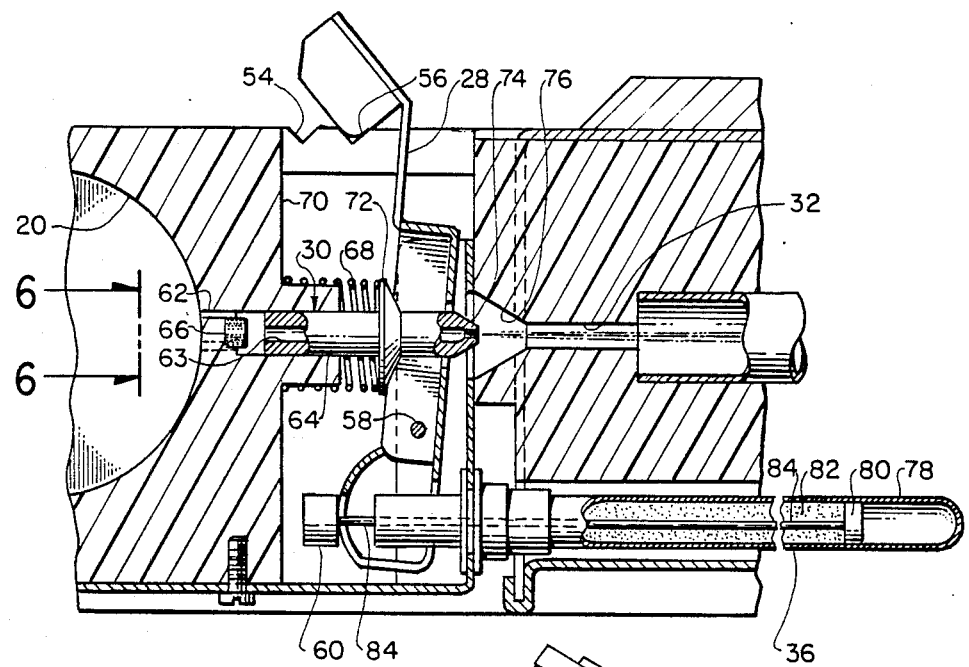
FIG. 5 is an enlarged cross-sectional detail of the switch and valve means in an open operating position.

Referring now to FIG. 5, the snap switch 28 has been shifted to the "ON" detent 56. Spring 68 pushes against reservoir wall 70 to bias collar 72 attached to tube 64 and, hence, tube 64 is biased toward the right also. Jet nozzle 74 of tube 64 then enters into the interior of the funnel 76 forming the left edge of pipe connection 32. This allows the fuel to flow from the reservoir 20, through fuel ports 62, past washer 66 into orifice 63, and hence, through tube 64 and squirted out of nozzle 74 through funnel 76 and then into pipe connection 32. After going through pipe connection 32, the fuel enters combustion cage 34 where it is ignited either by an existing flame or by sparks coming from the flint 42 and serrated sparking wheel 40. While in the "ON" position, snap switch 28 has turned on pivot 58 to pull plunger 60 of the thermocouple 36 towards the left.

Referring now to FIG. 5, a cross-section of thermocouple 36 is shown in greater detail. A container 78 is filled with a thermo-expandable material 82 from one end to a piston 80. The piston 80 is connected by a rod 84 to plunger 60. Plunger 60, as previously shown, engages one end of snap switch 28. The thermo-expandable material and the dimensions of container 78 should be chosen with the intent that once the desired temperature is reached for the liquid contents of cup 12, the thermo-expandable material will have sufficient force to push piston 80 far enough to the right to bring plunger 60 back to the position where snap switch 28 will snap into the "OFF" detent. The dimensions of the container 78 and the type of thermo-expandable material are well known to those skilled in the art. Therefore, in operation, the apparatus 10, once the snap switch 28 is put into "ON" detent 56, will allow fuel from reservoir 20 to flow through valve 30 into combustion cage 34. The heat generated from the combustion in combustion cage 34 will not only rise and heat the liquid in cup 12, but also will heat thermocouple 36 to eventually pull snap switch 28 back to "OFF" detent 54.

Figure 7:
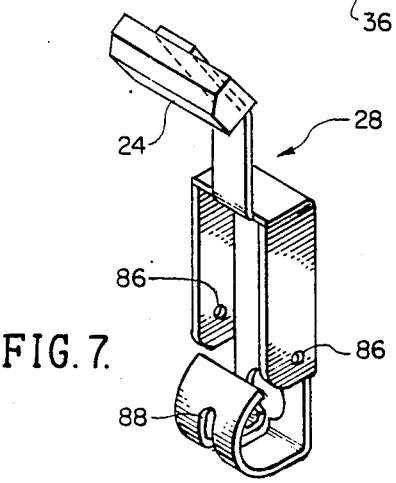
FIG. 7 is a perspective view of the snap switch.

FIG. 7 shows a perspective view of the snap switch 28. At the top is finger pad 24 which engages in either of the two detent positions, 54 and 56. Apertures 86 allow a pin to be inserted as the pivot 58. Transverse opening 88 allows the rod 84 from thermocouple 36 to penetrate through the bottom of snap switch 28 and locate the plunger 60 against a camming surface at the bottom left face of snap switch 28.

Finally, the raised circular pad 16 is made of a heat-retaining metal such as copper, and provides a positive engagement for stabilizing the position of the cup 12 upon the warming device 10.

The foregoing disclosure is representative of a preferred form of the invention and is to be interpreted in an illustrative rather than a limiting sense. The invention is to be accorded the full scope of the claims which follow.

I claim:

1. An apparatus for heating the contents of a vessel such as a cup containing a beverage, comprising:
   a housing with an upper surface adapted to support and transmit heat to said vessel;
   burner means within said housing,
   a fuel reservoir connected to said burner;
   ignition means for said burner;
   valve means to control flow of fuel from said reservoir to said burner;
   switch means to control said valve means; and
   thermocouple means connected to said switch means such that said thermocouple means, upon sensing a maximum predetermined temperature, moves the switch to close the valve and thereby shuts off the flow of fuel from said reservoir to said burner, said thermocouple means being positioned below both said upper surface of said housing and said burner means.

2. The apparatus of claim 1 wherein said fuel reservoir is refillable.

3. The apparatus of claim 1 wherein said ignition means includes a flint, a sparking wheel that strikes said flint during rotation, a knob outside of said housing, and connecting means that causes said sparking wheel to rotate when said knob is rotated.

4. The apparatus of claim 1 wherein said switch means includes a snap switch.

5. The apparatus of claim 4 wherein said snap switch has a finger pad at one end and a connecting means for receiving a plunger from said thermocouple means at the opposite end, with a pivot between the two ends.

6. The apparatus of claim 5 wherein said thermocouple means comprises a container with a piston therein filled with thermoexpandable material between the piston and one end of said container, said end penetrated by a rod which connects said piston to said plunger.

7. The apparatus of claim 1 wherein said valve means comprises a hollow tube, the walls of said tube at one end adapted to impinge on a washer at the outlet of said fuel reservoir when said valve means is closed, said washer being smaller in diameter than said reservoir outlet, but larger in diameter than said inside diameter of said tube walls; said tube at the opposite end adapted to enter the funnel-shaped end of a pipe connection to said burner means; said tube biased toward entry into said funnel-shaped end by a spring impinging on a collar attached to said tube, and said thermocouple means acting through said switch means to return said tube to a position impinging upon said washer when said thermocouple senses said predetermined temperature.

8. The apparatus of claim 1 wherein said housing contains vents to allow air to reach said burner means and to allow combustion products to exit from said apparatus.

9. The apparatus of claim 1 wherein said upper surface of said housing has a raised circular area that permits frictional engagement with a cup having an annular ring formed by the walls of said cup at the bottom thereof.

* * * * *